(12) United States Patent
Teoh et al.

(10) Patent No.: US 11,593,191 B2
(45) Date of Patent: Feb. 28, 2023

(54) SYSTEMS AND METHODS FOR SELF-HEALING AND/OR FAILURE ANALYSIS OF INFORMATION HANDLING SYSTEM STORAGE

(71) Applicant: DELL PRODUCTS L.P., Round Rock, TX (US)

(72) Inventors: Chai Im Teoh, Singapore (SG); Young Hwan Jang, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/374,892

(22) Filed: Jul. 13, 2021

(65) Prior Publication Data

US 2023/0025750 A1    Jan. 26, 2023

(51) Int. Cl.
*G06F 11/00*       (2006.01)
*G06F 11/07*       (2006.01)
*G06F 11/14*       (2006.01)

(52) U.S. Cl.
CPC ...... *G06F 11/0727* (2013.01); *G06F 11/0769* (2013.01); *G06F 11/0793* (2013.01); *G06F 11/1417* (2013.01)

(58) Field of Classification Search
CPC ............. G06F 11/0706; G06F 11/0709; G06F 11/0727; G06F 11/0736; G06F 11/0751; G06F 11/0766; G06F 11/0769; G06F 11/0784; G06F 11/0787; G06F 11/079; G06F 11/0793; G06F 11/1417; G06F 9/4401; G06F 9/4406; G06F 9/445
See application file for complete search history.

(56) References Cited

U.S. PATENT DOCUMENTS 6,598,179 B1 * 7/2003 Chirashnya ......... G06F 11/0706
                                                714/E11.026
6,651,183 B1 * 11/2003 Gensler, Jr. ......... G06F 11/0787
                                                714/E11.026

(Continued)

OTHER PUBLICATIONS

F. Baitinger, H. Elfering, G. Kreissig, D. Metz, J. Saalmuellerand F. Scholz, "System control structure of the IBM eServer z900," in IBM Journal of Research and Development, vol. 46, No. 4.5, pp. 523-535, Jul. 2002, doi: 10.1147/rd.464.0523. (Year: 2002).*

(Continued)

*Primary Examiner* — Anthony J Amoroso
(74) *Attorney, Agent, or Firm* — Egan, Enders & Huston LLP.

(57) ABSTRACT

Systems and methods are provided that may be implemented to perform failure analysis and/or self-healing of information handling system storage. In one example, an information handling system may perform self-recovery actions to self-heal system storage issues when there is a OS boot failure due to a failure to detect a system storage drive by determining one or more possible recovery actions based on a current system storage drive status retrieved by an embedded controller (EC) or other programmable integrated circuit of the information handling system. In another example, manufacturing quality control analysis may be performed on boot failure information that is collected at a remote server from multiple failed information handling systems.

29 Claims, 3 Drawing Sheets

(56) References Cited

U.S. PATENT DOCUMENTS

| | | | |
|---|---|---|---|
| 6,983,330 B1* | 1/2006 | Oliveira | H04L 69/32 709/239 |
| 7,307,948 B2* | 12/2007 | Infante | G06F 3/067 709/219 |
| 7,373,551 B2* | 5/2008 | Rothman | G06F 11/1417 714/36 |
| 8,176,168 B1* | 5/2012 | Ramamurthy | G06F 11/0712 709/224 |
| 8,819,228 B2* | 8/2014 | Ramamurthy | G06F 11/0712 709/224 |
| 11,048,570 B2* | 6/2021 | Karpagavinayagam | G06F 11/076 |
| 11,099,922 B2* | 8/2021 | Bisa | G06F 13/102 |
| 2016/0055058 A1* | 2/2016 | Zheng | G06F 11/10 714/764 |
| 2018/0246552 A1* | 8/2018 | Thompson | G06F 11/3093 |

OTHER PUBLICATIONS

Dell Support, "ePSA Diagnostics Additional Resources", Feb. 21, 2021, 1 pg.

Dell Support, "How Do I Submit an ePSA or QR Code Online for Additional Troubleshooting?", Printed from Internet Jun. 23, 2021, 2 pgs.

Dell Support, "How to Enter the Built-In Diagnostics (32-Bit Diagnostics, SupportAssist ePSA, ePSA, and PSA)", Feb. 21, 2021, 4 pgs.

Dell Support, "How to Run the Online Diagnostics and Use the Diagnostics for Troubleshooting", Jan. 13, 2021, 4 pgs.

Dell Support, Reference Table of ePSA, PSA Error Codes, and Troubleshooting Steps (2000-oNNN Series), Printed from Internet Jun. 23, 2021, 23 pgs.

Dell Support, Reference Table of ePSA, PSA Error Codes, and Troubleshooting Steps (2000-4NNN Series), Jan. 14, 2021, 4 pgs.

Dell Support, Reference Table of ePSA, PSA Error Codes, and Troubleshooting Steps (2000-8NNN Series), Printed from Internet Jun. 23, 2021, 15 pgs.

Dell Support, Resolve Hardware Issues With Integrated and Online Diagnostics (SupportAssist ePSA, ePSA, or PSA Error Codes), Printed from Internet Jun. 23, 2021, 2 pgs.

Wikipedia, "S.M.A.R.T.", Printed from Internet Jun. 29, 2021, 22 pgs.

Dell Support, "What are the SupportAssist ePSA, ePSA and PSA Diagnostics?", Printed From Internet, Jun. 23, 2021, 1 pg.

* cited by examiner

SYSTEMS AND METHODS FOR SELF-HEALING AND/OR FAILURE ANALYSIS OF INFORMATION HANDLING SYSTEM STORAGE

FIELD OF THE INVENTION

This application relates to operating systems of information handling systems and, more particularly, to system storage for information handling systems.

BACKGROUND

As the value and use of information continues to increase, individuals and businesses seek additional ways to process and store information. One option available to human users is information handling systems. An information handling system generally processes, compiles, stores, and/or communicates information or data for business, personal, or other purposes thereby allowing human users to take advantage of the value of the information. Because technology and information handling needs and requirements vary between different human users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific human user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Laptop and desktop computer information handling systems sometimes fail to boot into the operating system (OS). In one case, when an OS boot failure occurs, a system user may run a diagnostic software tool (Dell Support Assist ePSA or PSA™ available from Dell Technologies Inc. of Round Rock, Tex.) on the affected system to obtain an error code that corresponds to the boot failure. In such a case, the system user may obtain the error code from the diagnostic software and report it to a technical service call center. However, in some cases, there is limited available diagnostic information that can be used by technical service personnel to debug the cause of a particular OS boot failure. For example, if an OS boot failure is related to a system storage drive (i.e., solid state drive "SSD" or hard disk drive "HDD"), a system user may only obtain an error code of "Drive Not Detected" from running a diagnostic software.

A "Drive Not Detected" error code can have a number of different root causes, e.g., such as a failed PCIe or SATA connection between the host CPU and the system storage drive, a system power instability, a system storage drive abnormality or failure causing the system storage drive to fail to boot, etc. In such a case, technical service personnel are only able to determine more information regarding the cause of the OS boot failure by physically examining and debugging the affected system (e.g., at the system user site), manually resetting the failed systems, and if necessary by replacing the system storage drive/s and/or system motherboard until the system is fixed. Thus, the cause of the OS boot failure may only be fixed after trial and error attempts in the field, without any information on the root cause/s of the OS boot failure.

SUMMARY OF THE INVENTION

Disclosed herein are systems and methods for failure analysis and/or self-healing of information handling system storage. In one embodiment, the disclosed systems and methods may be implemented to allow an information handling system to self-heal system storage issues when there is a OS boot failure due to a failure to detect a system storage drive (e.g., SSD, HDD, etc.), e.g., by executing a system basic input output system (BIOS) code on a host programmable integrated circuit (e.g., CPU) on the system to determine one or more possible recovery actions based on a current system storage drive status retrieved by an embedded controller (EC) or other programmable integrated circuit of the information handling system. Examples of such recovery actions include, but are not limited to, executing the host programmable integrated circuit to initiate self-healing via a second and alternative signal path upon failure of a first and primary signal path failure to the system storage (e.g., such as a PCIe or SATA primary connection fail to the system storage that occurs due to protocol errors or signal integrity). This self-healing capability is not possible for conventional information handling systems which have only a single PCIe or SATA signal communication path between a host programmable integrated circuit and the system storage.

In one embodiment, the disclosed systems and methods may be implemented to determine information on the information handling system status and/or a system storage drive log at the time an OS boot failure occurs due to failure to detect a system storage drive, and this failure information may be logged and stored on non-volatile storage space of the system, e.g., so that the logged failure information may then be provided across a network to a remote server where it may be used to facilitate future failure analysis by providing the failure information across a network to a remote server where it may be collected and stored. Advantageously, this collected failure information at the remote server may be made available to technical service personnel before they arrive at the physical site or location of the failed information handling system and its user. In this way, the technical service personnel may be informed beforehand of the information handling system status, and thus better prepared to address the cause/s of the OS boot failure before going on site so that system repair time may be shortened. This is in contrast to the case of a conventional information handling system OS boot failure, where only limited system diagnostic software failure information is available about the information handling system and its system storage from the system user in the field, and where there is no other available non-volatile storage space for logging system storage failure information besides the failed drive of the storage system itself.

In one exemplary embodiment, manufacturing quality control analysis may be performed on the above-described OS boot failure information that is collected at a remote server from multiple failed information handling systems. Such quality control analysis may include, for example, statistical analysis of the collected OS boot failure information and/or data driven isolation as to whether a "Drive Not Detected" failure for a given information handling system model is likely caused by a particular type of motherboard or a particular system storage drive model (e.g., a particular SSD or HDD model), etc. Additionally or alternatively, further debug or manufacturing decisions (e.g., such as a manufacturing on-hold plan or redesign of one or more information handling system components) may be decided upon based on the quality control analysis of the collected OS boot failure information from multiple information handling systems that are operating in the field.

Advantageously, self-healing and data collection embodiments of the disclosed systems and methods may be implemented to reduce failures encountered by information handling system end users and to improve system end user experience, e.g., and in some embodiments without requiring technical service personnel to physically examine and debug an affected system at the system user site in the field to determine the cause of the OS boot failure by physically examining and debugging the affected system, thus eliminating the need to manually reset a failed system and/or replace the system storage drive/s and/or system motherboard until the affected system is successfully repaired. Moreover, enabling OS boot failure data collection may be implemented to improve product quality and robustness of future manufactured information handling systems.

In one respect, disclosed herein is a method, including making a first attempt to read and write a system storage of a first information handling system across a first data communication path to load and boot an operating system (OS) on the first information handling system; and then only one of: loading and booting the OS on the first information handling system from the system storage of the first information handling system across the first data communication path only if the first attempt succeeds to read and write the system storage of the first information handling system; or providing a first request to the system storage for a current system storage status of the first information handling system across a second and different data communication path only if the first attempt to read and write the system storage fails due to an error that prevents reading and writing the system storage of the first information handling system.

In another respect, disclosed herein is an information handling system, including: a host programmable integrated circuit; system storage coupled to the host programmable integrated circuit by a first data communication path; and an out-of-band programmable integrated circuit coupled to the system storage by a second and different data communication path and coupled to the host programmable integrated circuit by a third and different data communication path. The host programmable integrated circuit may be programmed to make a first attempt to read and write the system storage across the first data communication path to load and boot an operating system (OS) on the information handling system, and then only one of: load and boot the OS on the information handling system from the system storage across the first data communication path only if the first attempt succeeds to read and write the system storage of the first information handling system, or provide a first command across the third data communication path from the host programmable integrated circuit to the out-of-band programmable integrated circuit only if the first attempt to read and write the system storage fails due to the error that prevents reading and writing the system storage of the first information handling system, the first command causing the out-of-band programmable integrated circuit to provide a first request to the system storage across the second and different data communication path for the current status of the system storage of the first information handling system.

In another respect, disclosed herein is a system including a client information handling system coupled across a network to a separate remote server information handling system. The client information handling system may include: a host programmable integrated circuit; system storage coupled to the host programmable integrated circuit by a first data communication path; and an out-of-band programmable integrated circuit coupled to the system storage by a second and different data communication path and coupled to the host programmable integrated circuit by a third and different data communication path. The host programmable integrated circuit may be programmed to make a first attempt to read and write the system storage across the first data communication path to load and boot an operating system (OS) on the client information handling system, and then only one of: load and boot the OS on the client information handling system from the system storage across the first data communication path only if the first attempt succeeds to read and write the system storage of the client information handling system, or provide a first command across the third data communication path from the host programmable integrated circuit to the out-of-band programmable integrated circuit only if the first attempt to read and write the system storage fails due to the error that prevents reading and writing the system storage of the client information handling system, the first command causing the out-of-band programmable integrated circuit to provide a first request to the system storage across the second and different data communication path for the current status of the system storage of the client information handling system.

DESCRIPTION OF ILLUSTRATIVE EMBODIMENTS

Figure 1:
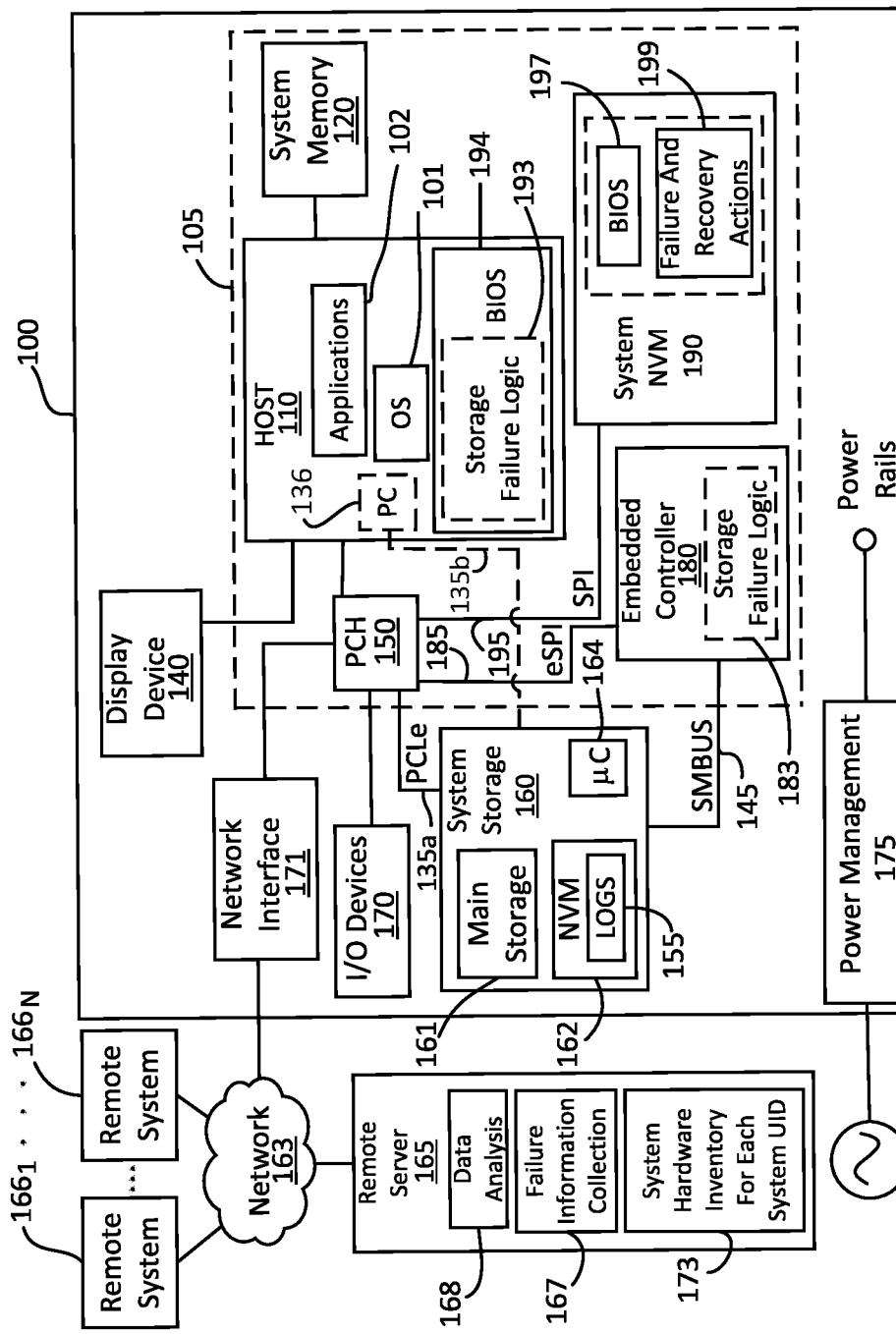
FIG. 1 illustrates a block diagram of an information handling system according to one exemplary embodiment of the disclosed systems and methods.

FIG. 1 is a block diagram of an information handling system 100 (e.g., a client information handling system such as a desktop computer, laptop computer, tablet computer, MP3 player, personal data assistant (PDA), cell phone, etc.) as it may be configured according to one embodiment of the disclosed systems and methods. In this regard, it should be understood that the configuration of FIG. 1 is exemplary only, and that the disclosed methods may be implemented on other types of information handling systems. It should be further understood that while certain components of an information handling system are shown in FIG. 1 for illustrating embodiments of the disclosed systems and methods, the information handling system is not restricted to including only those components shown in FIG. 1 and described below.

As shown in FIG. 1, information handling system 100 may generally include a motherboard and circuitry 105 together with a host programmable integrated circuit 110 for executing an operating system (OS) 101 (e.g., proprietary OS such as Microsoft Windows 10, open source OS such as Linux OS, etc.) and BIOS 194 for system 100, as well as other code such as user software applications 102 (e.g., word processing application, Internet browser, computer game, PDF viewer, spreadsheet application, etc.), etc. In the embodiment of FIG. 1, host programmable integrated circuit 110 may be configured to access non-volatile memory 190 (e.g., serial peripheral interface (SPI) Flash memory) to load and boot part of a system BIOS 194. As shown, BIOS 194 includes storage failure logic 193 that is programmed to execute as part of BIOS 194 on host programmable integrated circuit 110 in a manner as described further herein. Host programmable integrated circuit 110 may include any type of processing device, such as an Intel central processing unit (CPU), an Advanced Micro Devices (AMD) CPU or another programmable integrated circuit. Host programmable integrated circuit 110 is coupled as shown to system memory 120, which may include, for example, random access memory (RAM), dynamic RAM (DRAM), synchronous DRAM (SDRAM), etc.

In the illustrated embodiment, host programmable integrated circuit 110 may be coupled to an external or internal (integrated) display device 140 (e.g., LCD or LED display or other suitable display device) depending on the particular configuration of information handling system 100. In such an embodiment, integrated graphics capability may be implemented by host programmable integrated circuit 110 to provide visual images (e.g., a graphical user interface, static images and/or video content) to a system user. However, in other embodiments, a separate programmable integrated circuit (e.g., such as graphics processor unit "GPU") may be coupled between host programmable integrated circuit 110 and display device 140 to provide graphics capability for information handling system 100.

PCH 150 controls certain data paths and manages information flow between components of the information handling system 100. As such, PCH 150 may include one or more integrated controllers or interfaces for controlling the primary data paths connecting PCH 150 with host programmable integrated circuit 110, system storage 160, input/output (I/O) devices 170 forming at least a part of a user interface for the information handling system, network interface (I/F) device 171, out-of-band programmable integrated circuit 180, and system NVM 190 where BIOS firmware image and settings 197 may be stored together with system storage recover actions 199 and other components such as ACPI firmware, etc. In one embodiment, PCH 150 may include a Serial Peripheral Interface (SPI) controller and an Enhanced Serial Peripheral Interface (eSPI) controller. In some embodiments, PCH 150 may include one or more additional integrated controllers or interfaces such as, but not limited to, a Peripheral Controller Interconnect (PCI) controller, a PCI-Express (PCIe) controller, a low pin count (LPC) controller, a Small Computer Serial Interface (SCSI), an Industry Standard Architecture (ISA) interface, an Inter-Integrated Circuit ($I^2C$) interface, a Universal Serial Bus (USB) interface and a Thunderbolt™ interface.

In one embodiment of FIG. 1, a PCIe bus 135a forms a primary communication path through PCH 150 between host programmable integrated circuit 110 and system storage 160 as shown. In an alternative embodiment of FIG. 1 a PCIe bus 135b may form a primary communication path directly between a port of host programmable integrated circuit 110 and system storage 160 (as shown in dashed outline). In the latter embodiment, host programmable integrated circuit 110 may include an integrated PCIe controller (PC) 136 that is coupled to PCIe bus 135b through the connected port of host programmable integrated circuit 110 as shown. Other types of primary communication paths include, but are not limited to, SATA bus, etc.

As shown, external and/or internal (integrated) I/O devices 170 (e.g., a keyboard, mouse, touchpad, touch-screen, etc.) may be coupled to PCH 150 of system 100 to enable a human user to input data and interact with information handling system 100, and to interact with application programs or other software/firmware executing thereon. The network I/F device 171 enables wired and/or wireless communication with a remote server 165 (e.g., that is operated by manufacturer of system 100 and other information handling systems 166. and that maintains non-volatile memory or storage containing collected failure information 167 from information handling systems such as system 100 and other remote information handling systems 166) via an external network 163 (e.g., the Internet), and in one embodiment may be a network interface controller (NIC) which may communicate with external network 163 across an intervening local area network (LAN), wireless LAN (WLAN), cellular network, etc. In addition to the collected failure information 167, a system hardware inventory 173 for each system 100 and other remote information handling systems 166 may also be maintained in non-volatile memory or storage as shown and further described herein.

Also shown in FIG. 1 is optional data analysis logic 168 that may be executed, e.g., to perform statistical data analysis of collected OS boot failure information data in collected failure information 167 by a host programmable integrated circuit (e.g., CPU) of remote server 165 in a manner as described elsewhere herein. Alternatively such data analysis logic 168 may be executed on one or more other remote information handling system 166. It will be understood that remote server 165 and each of remote information handling systems 166 may be configured in one embodiment with one or more similar components and similar system architecture as information handling system 100.

Also shown present in FIG. 1 is local system storage 160 (e.g., one or more media drives, such as hard disk drives (HDDs), optical drives, NVRAM, Flash memory, solid state drives (SSDs), or any other suitable form of internal or external storage) that is coupled through PCH 150 to provide non-volatile storage media 161 (e.g., hard drive disk, solid state drive memory elements, optical drive disk, etc.) for information handling system 100. As shown, system storage 160 also includes a storage system programmable integrated circuit 164 in the form of a microcontroller (X) that is coupled to dedicated non-volatile memory 162 (e.g., dedicated Flash memory) that is dedicated for use by storage system programmable integrated circuit 164 as described further herein. In this regard dedicated non-volatile memory 162 is separate and different from main non-volatile storage media 161 (e.g., hard drive disk, solid state drive memory elements, optical drive disk, etc.) that is used for storing user data for other components of system storage 160. As shown, dedicated non-volatile memory 162 stores system storage event log/s 155 that are created and updated by storage system programmable integrated circuit (e.g., storage system μC) 164. System storage event log/s 155 may include logs of system operation that records system storage events (e.g., with corresponding event timestamps, persistent error/s, counters, etc.) such as read and/or write failure/s of main storage media 161, failure of system storage connection to successfully connect to PCIe communication path 135a or 135b, etc. Besides a microcontroller, a storage system programmable integrated circuit 164 may alternatively be another suitable type of programmable integrated circuit, e.g., such as FPGA, ASIC, etc.

A power source for the information handling system 100 may be provided via an external power source (e.g., mains power) and an internal power supply regulator, and/or by an internal power source, such as a battery. As shown in FIG.

1, power management system 175 may be included within information handling system 100 for moderating the available power from the power source. In one embodiment, power management system 175 may be coupled to provide operating voltages on one or more power rails to various power-consuming components of information handling system 100, as well as to perform other power-related administrative tasks of the information handling system.

Also shown in FIG. 1, is an out-of-band programmable integrated circuit 180 in the form of an embedded controller (EC) that is coupled to PCH 150 and which may be programmed to perform tasks of storage failure logic 183 as described elsewhere herein, and to execute other logic such as power/thermal system management, etc. Out-of-band programmable integrated circuit 180 may also be programmed to execute program instructions to boot information handling system 100, load application firmware from NVM 190 into internal memory, launch the application firmware, etc. Out-of-band programmable integrated circuit 180 may be, for example, a controller, microcontroller, microprocessor, ASIC, etc., or as a programmable logic device "PLD" such as FPGA, complex programmable logic device "CPLD", etc. Besides an embedded controller, other examples of out-band-programmable integrated circuits include, but are not limited to, baseboard management controller "BMC", service processor, embedded processor, remote access controller, etc. In this regard, an out-of-band programmable integrated circuit 180 is separate and independent from in-band host programmable integrated circuit 110 that runs the host OS 101 of the information handling system 100, and that executes without management of any application 102 executing with the host OS 101 on the host programmable integrated circuit 110.

As shown in the exemplary embodiment of FIG. 1, EC 180 is coupled to PCH 150 via data bus 185, and NVM 190 is coupled to PCH 150 via data bus 195. According to one embodiment, data bus 195 is a Serial Peripheral Interface (SPI) bus, and data bus 185 is an Enhanced Serial Peripheral Interface (eSPI) bus. In the embodiment shown in FIG. 1, NVM 190 may be a SPI Flash memory device that is a shared Flash memory device, which is connected to PCH 150 and EC 180. In such a configuration, PCH 150 provides EC 180 shared access to NVM 190 via eSPI bus 185, SPI bus 195, and various interface and logic blocks included within the PCH 150. As further shown, an additional sideband communication path 145 (e.g., SMBus or other type sideband connection such as GPIO, SPI, etc.) may be provided to directly interconnect EC 180 with μC 164.

Figure 2:
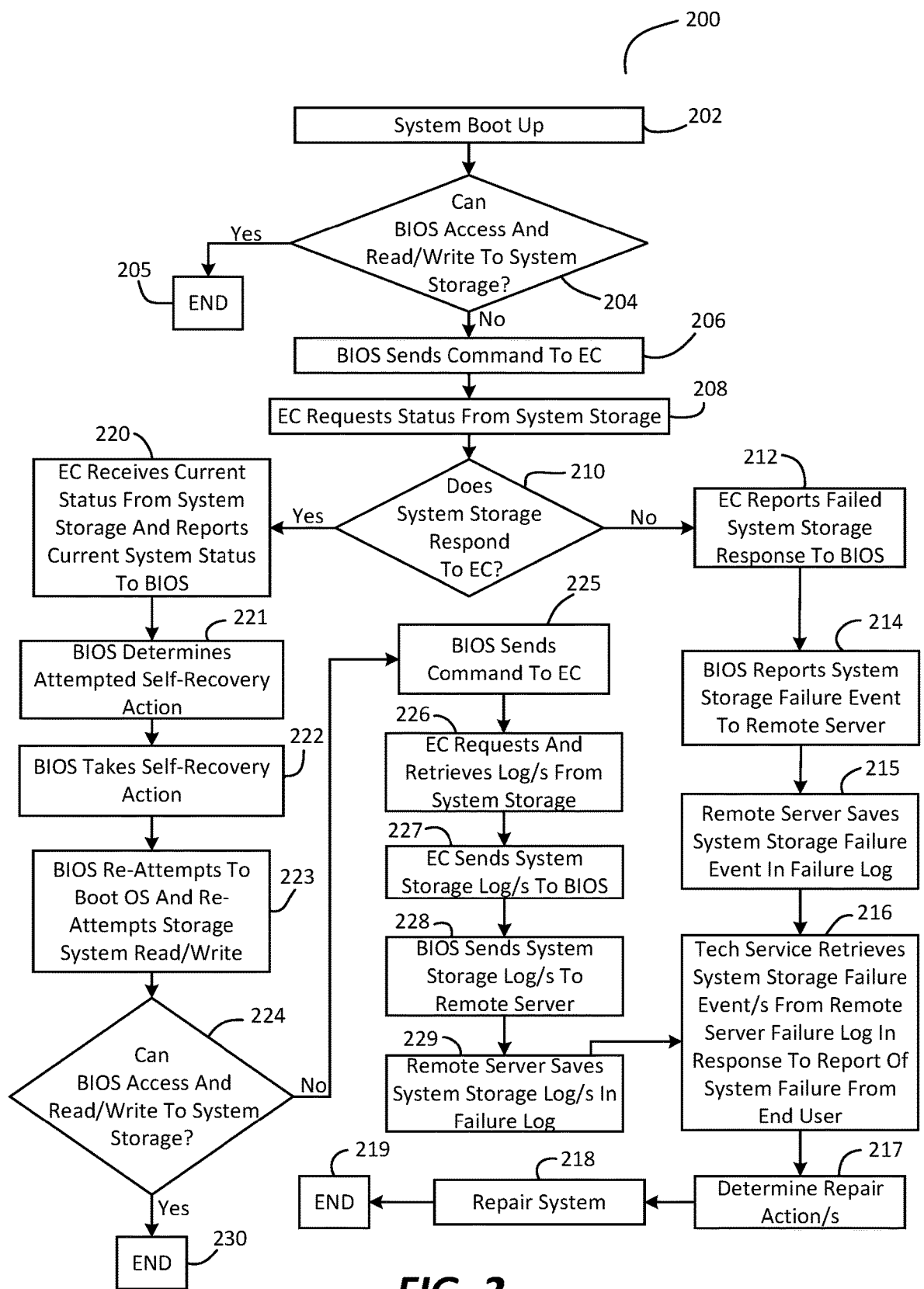
FIG. 2 illustrates methodology according to one exemplary embodiment of the disclosed systems and methods.

FIG. 2 illustrates one exemplary embodiment of methodology 200 that may be implemented in part by storage failure logic 193 of BIOS 194 together with storage failure logic 183 of EC 180 and with logic executing on μC 164 to collect storage system failure information and/or perform storage system self-healing on client information handling system 100 by performing one or more self-recovery actions. For purpose of example, methodology 200 is described in relation to the exemplary information handling system embodiment of FIG. 1. However, it will be understood that methodology 200 may be implemented with other information handling system configurations, and using other types of out-of-band programmable integrated circuits 180 besides the embedded controller (EC) and/or with other types of storage system programmable integrated circuits 164 besides the microcontroller (X) illustrated in FIG. 1. Moreover, other and alternative combinations of firmware and/or software (possibly executing on other programmable integrated circuit/s of system 100 besides a host programmable integrated circuit 110 and/or an out-of-band programmable integrated circuit 180) may be executed to perform one or more of the blocks of methodology 200.

As shown, methodology 200 begins in block 202 where information handling systems begins system boot up, e.g., when the system end user powers on or resets information handling system 100. Next in block 204, BIOS 194 is loaded from BIOS firmware 197 and executes on host programmable integrated circuit 110 to attempt to boot to OS 101 by loading software code for OS 101 from system storage 160 onto host programmable integrated circuit 110 where OS 101 is then executed. To load OS 101 for execution on host programmable integrated circuit 110, BIOS 194 attempts to access system storage 160 in block 204 via the primary communication path of PCIe bus 135a or 135b to read data from, and write data to, storage media 161 of system storage 160. If BIOS 194 successfully accesses system storage 160 via the primary communication path 135a or 135b and successfully reads and writes data to/from storage media 161 in block 204, then the system proceeds to successfully boot to OS 101 on host programmable integrated circuit 110, and methodology 200 ends in block 205.

However, if in block 204 BIOS 194 fails to access system storage 160 and/or fails to successfully read and write data to/from main storage media 161 via the primary communication path 135a or 135b, then the attempted boot to OS 101 fails and methodology 200 proceeds to block 206 where storage failure logic 193 of BIOS 194 sends a command via eSPI 185 to EC 180 to request that EC 180 connect with storage system μC 164 of system storage (e.g., SSD, HDD, etc.) through sideband communication path 145. In one exemplary embodiment of block 204, BIOS 194 may make a predesignated number of attempts to access storage system 160 to read/write main storage media 161 via primary communication path 135a or 135b before BIOS 194 will hit a time out after this predesignated number of attempts fails and the read/write attempt of block 204 is determined to be a failure.

Next, in block 208, storage failure logic 183 of EC 180 responds to the BIOS request of block 206 by communicating across sideband communication path 145 with storage system μC 164 to request the current status of system storage 160 (e.g., any system storage error code/s available from system storage self-diagnostics). If in block 210 storage system μC 164 fails to respond by sideband communication path 145 to the request sent from EC 180 in block 208 (e.g., after predefined timeout period), then in block 212 storage failure logic 183 of EC 180 may report this failed system storage response event to BIOS 194 executing on host programmable integrated circuit 110. This confirms to BIOS 194 that system storage 160 has failed, and storage failure logic 193 of BIOS 194 may then determine in block 214 (e.g., based on a predefined system failure action determined from stored system storage failure and recovery actions 199) to report a system storage failure event across network 163 to remote server 165, which in turn may then store the system storage failure on information handling system 100 in block 215 as a failure event in the collected failure information 167 (e.g., failure information collection log) that is maintained by remote server 165.

In one embodiment of block 214, storage failure logic 193 of BIOS 194 may report a system storage failure event status across network 163 to remote server 165 together with system identifier information for system 100, e.g., such as a system manufacturer-assigned unique identifier (UID) such as a service tag or serial number which may be stored together with other failure event status information (e.g., failure date and time, storage system type, etc.) in the failure information collection log 167 that is maintained by remote server 165. In block 216, this failure event information may later be retrieved from the collected failure information 167 by centralized technical service personnel (e.g., who may be located physically remote from system 100) based on the system manufacturer-assigned unique identifier (UID) for system 100, and then analyzed or otherwise used in block 217 to determine needed repair actions (e.g., field repair actions) and needed replacement hardware components (e.g., replacement storage system drive, etc.) for system 100 to specifically address the reported failed system storage status, e.g., before any technical service personnel are dispatched to the local physical location of system 100 and its end user. When so dispatched, the technical service personnel may take with them the particular replacement hardware component/s determined to be needed to complete the determined repair actions of block 217, and then proceed to repair system 100 in block 218 by taking the previously determined repair actions of block 217 on system 100.

Using the system manufacturer-assigned UID for a given information handling system 100 in block 217, the centralized technical service personnel may determine the particular type/s of hardware components (e.g., such as the particular storage system drive model) that are installed on the given system 100. This is because the system manufacturer-assigned UID for the given system 100 is linked to both the particular system storage failure event status for the given system 100 that is maintained in collected failure information 167, as well as to the particular system hardware component inventory for the given system 100 that is maintained in system hardware inventory 173. This allows centralized technical service personnel in block 216 to correlate the system storage failure event status for system 100 from collected failure information 167 to the types (e.g., models) of hardware components (i.e., retrieved from system hardware inventory 173) that are installed in the given information handling system 100.

For example, in response to a telephone call made to a technical service call center from the end user of system 100 that reports an OS boot failure for system 100 together with its UID, this failure event information may be retrieved in block 216 from remote server 165, e.g., across network 163 for analysis by technical service call center personnel operating one or more of other remote systems 166. Alternatively, in block 216 an end user of system 100 may report such an OS boot failure for system 100 together with its UID across network 163 via a chat function or other online and/or website technical service reporting technique that is executing on one or more of other remote systems 166. Methodology 200 then ends in block 219 as shown.

Returning to block 210 of methodology 200, if storage system µC 164 responds across sideband communication path 145 to the request sent from EC 180 in block 208 (e.g., by reporting the updated current status of system storage 160 to EC 180), then storage failure logic executing on EC 180 may report the updated current system storage status via eSPI 185 to BIOS 194 in block 220. Examples of such reported status of system storage 160 include, but are not limited to, system storage error codes corresponding to a system storage NAND storage media read limit being exceeded (due to storage media wear out condition), a storage system metadata table data corruption, etc. In block 221, storage failure logic 193 of BIOS 194 may then determine an attempted self-recovery action to take in block 222 that is based on the nature of the current system storage status reported by EC 180 in block 220. Storage failure logic 193 of BIOS 194 may make this determination in block 221, for example, based on a lookup table or other stored predefined relationship between different reported system storage status and corresponding recovery actions that may be maintained in system storage failure actions 199 stored on system NVM 190.

Table 1 lists examples of possible attempted system storage recovery actions to be taken in block 222 by storage failure logic 193 of BIOS 194 executing on host programmable integrated circuit 110 based on corresponding reported system storage status of block 220, as well as a possible system storage failure action of block 214 describe above. The system storage failure and recovery actions of Table 1 may, for example, be stored as a look up table in system storage failure and recovery actions 199 on NVM 190. It will be understood that alternative and/or additional failure and recovery actions are possible in other embodiments.

TABLE 1

| Reported System Storage Status to BIOS 194 from EC 180 in Block 220 or Block 212 | Recovery Action to be taken by BIOS 194 in Block 222 or Failure Reporting Action to be taken by BIOS 194 in Block 214 |
|---|---|
| EC 180 reports in block 220 that storage system µC 164 is active, but responds to SMBus request by reporting that it cannot recognize host programmable integrated circuit 110 (e.g., due to signal integrity problem or lack of continuity between system storage 160 and host programmable integrated circuit 110) | Send command in block 222 via eSPI 185 to EC 180 to cause EC 180 to send request via SMBus 145 to storage system pC 164 to reboot system storage 160 and attempt new handshake (e.g., to attempt to renegotiate connection between system storage 160 and host programmable integrated circuit 110) |
| EC 180 reports in block 220 that storage system µC 164 is active, but responds to SMBus request by reporting that it did not receive read/write request from BIOS 194 over primary PCIe communication path 135a or 135b | Take action/s in block 222 to reset components (e.g., PCIe controller/s 136) on host programmable integrated circuit 110, and then resend read/write request to system storage 160 across primary PCIe communication path 135a or 135b |
| EC 180 reports in block 220 that storage system µC 164 is active, but responds to SMBus request by reporting that data on storage media 161 is corrupt | Take action in block 222 to confirm and report a system storage data corruption failure event across network 163 to remote server 165 |
| EC 180 reports in block 212 that storage system pC 164 is not responsive to SMBus request from EC 180 | Take action in block 214 to confirm and report a system storage failure event across network 163 to remote server 165 |

After taking the determined system storage recovery action in block 222 (e.g., determined from Table 1), storage failure logic 193 of BIOS 194 causes BIOS 194 to execute on host programmable integrated circuit 110 to re-attempt boot into OS 101 and make another attempt to access system storage 160 in block 223 via the primary communication path of PCIe bus 135a or 135b to read data from, and write data to, storage media 161 of system storage 160.

If BIOS 194 accesses system storage 160 via the primary communication path 135a or 135b and successfully reads and writes data to/from storage media 161 in block 224 to load and execute OS 101 on host programmable integrated circuit 110, then system 100 has automatically self-healed the cause of the failure of system storage 160 (e.g., without intervention of technical service personnel or other repair action performed by an entity outside system 100) and OS 101 is successfully booted with methodology 200 ending in block 230. However, if BIOS 194 still fails to access system storage 160 and/or fails to successfully read and write data to/from main storage media 161 via the primary communication path 135a or 135b in block 224 (e.g., after a predesignated number of attempts), then OS 101 cannot be loaded and executed on host programmable integrated circuit 110. In this case, the re-attempted boot to OS 101 fails and methodology 200 proceeds to block 225 where storage failure logic 193 of BIOS 194 sends a command via eSPI 185 to EC 180 to request that EC 180 connect with storage system μC 164 through sideband communication path 145 to read and report the system storage event log/s 155 on system storage 160 to EC 180. EC 180 responds in block 226 by making this request to storage system μC 164 and retrieving from storage system μC 164 the system storage event log/s 155 that include a history of system storage events (e.g., system storage failure event type together with corresponding event failure date and time). As previously described, such system storage events may include read and/or write failure/s of main storage media 161, failure of system storage connection to successfully connect to PCIe communication path 135a or 135b, etc. Specific examples of system storage event log/s 155 include, but are not limited to, Self-Monitoring, Analysis and Reporting Technology (S.M.A.R.T.) log, persistent error log for system storage 160 (including error codes for events occurring over system storage lifetime such as system storage thermal excursions, etc.), telemetry counter/s (e.g., cumulative number of storage system data errors, cumulative number of storage system power cycles, cumulative number of storage system power failures, etc.), etc.

Next, in block 227, EC 180 may forward the retrieved system storage event log/s 155 of block 226 to storage failure logic 193 of BIOS 194 via eSPI communication path 185. In block 228, storage failure logic 193 of BIOS 194 may then report the retrieved system event log/s 155 of block 226 across network 163 to remote server 165 (e.g., together with other information such as a system manufacturer-assigned unique identifier (UID) for system 100 and a host metadata log which includes current BIOS 194 version identifier, host programmable integrated circuit 110 (e.g., CPU) model identifier, current versions of drivers executing on host programmable integrated circuit 110, etc.) which may then be stored in block 229 together with other failure event information of system storage event log/s 155 (e.g., system storage failure type, failure date and time, storage system type, etc.) in the collected failure information 167 that is maintained in non-volatile memory and/or storage by remote server 165.

Methodology 200 may proceed as shown from block 229 to block 216, which has been previously described. In this regard, failure event information (including reported failure event information of system storage event log/s 155) may later be retrieved from the collected failure information 167 by centralized technical service personnel based on the system manufacturer-assigned unique identifier (UID) for system 100, and then analyzed or otherwise used to determine repair actions for system 100 to specifically address the reported failed system storage status, e.g., before any technical service personnel are dispatched to the local physical location of system 100 and its end user in response to a telephone call or website or online failure report made by the end user of system 100 that reports an OS boot failure for system 100. When so dispatched, the technical service personnel may take with them the required replacement hardware components (e.g., replacement PCIe controller and/or replacement storage system drive, etc.) needed to complete the determined repair actions of block 216, and then proceed to repair system 100 by taking the previously determined repair actions of block 216 on system 100. Methodology 200 then ends in block 218 as shown as previously described.

It will be understood that the particular combination of blocks of methodology 200 is exemplary only, and that other combinations of additional and/or alternative blocks may be employed that are suitable for collecting storage system failure information and/or performing storage system self-healing or self-recovery.

Figure 3:
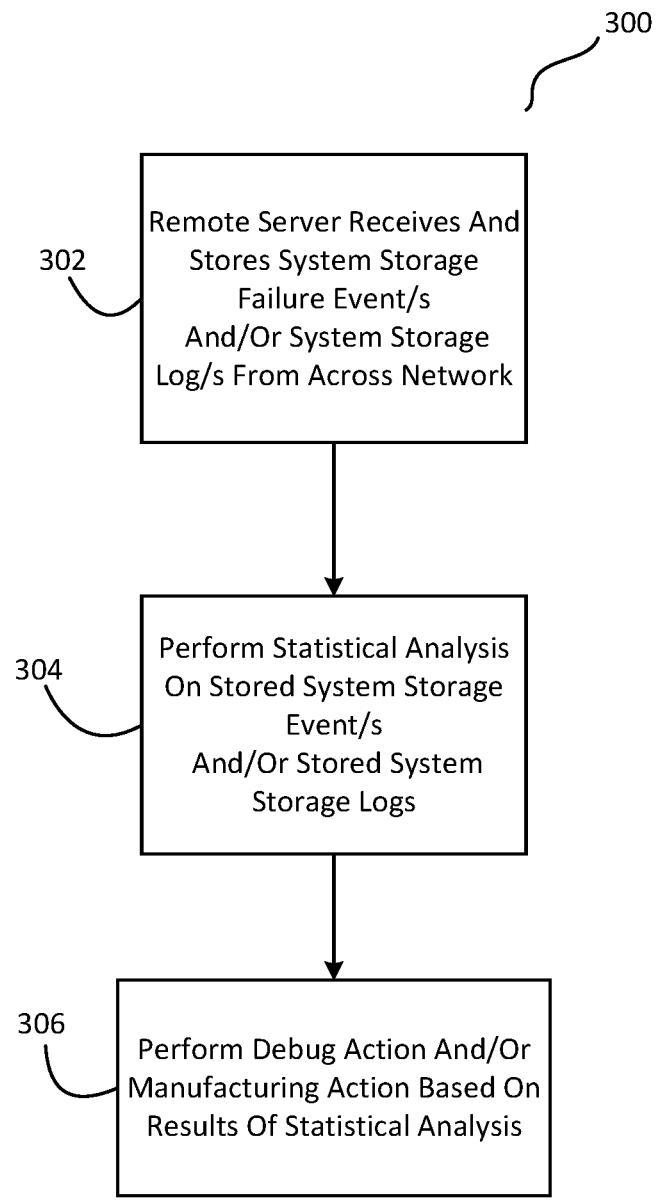
FIG. 3 illustrates methodology according to one exemplary embodiment of the disclosed systems and methods.

FIG. 3 illustrates one exemplary embodiment of methodology 300 that may be implemented (e.g., by data analysis logic 168 executing on remote server 165 or other remote information handling system) for performing manufacturing quality control analysis and reduce system storage failure rate based on OS boot failure information that is collected (and stored) in collected failure information 167 of remote server 165 across network 163 from multiple failed information handling systems, e.g., such as information handling system 100 and one or more of other remote information handling systems 166 that are configured similar to information handling system 100 with storage failure logic 193 of BIOS 194, storage failure logic 183 of EC 180, and logic executing on μC 164 that operate together to perform methodology 200 of FIG. 2 to collect storage system failure information and/or perform storage system self-healing for each of the multiple different information handling systems 100 and 166.

As shown, methodology 300 begins in block 302, where system storage failure event status of block 214 of methodology 200 and/or failure event information of system storage event log/s 155 of block 228 of methodology 200 is received across network 163 by remote server 165 and stored in collected failure information 167 on remote server 165 together with respective system identifier information for each of the affected systems 100 and 166 that have experienced a particular OS boot failure.

Next, in block 304, data analysis logic 168 executing on remote server 165 (or on another information handling system) may perform a statistical analysis of the collected system storage failure event status information and/or failure event information of system storage event log/s received from the multiple different information handling systems 100 and 166 and stored in collected failure information 167, e.g., to identify recurring failures of a particular type (e.g., particular system storage drive model) of system storage on multiple different information handling systems, to identify recurring system storage failures occurring on multiple information handling systems that are equipped with a particular configuration of motherboard 105 (or other hardware component) that is likely causing the system storage failure, etc. In this regard, the system manufacturer-assigned unique identifier (UID) for each of the multiple affected information handling systems 100 and 166 is linked to the corresponding failure information (e.g., including system storage event log/s) for each of the reported OS boot failures maintained in collected OS boot failure information of collected failure information 167, and the manufacturer system hardware inventory for each system UID is maintained in system hardware inventory 173 on non-volatile memory or storage. This allows data analysis logic 168 to correlate each OS boot failure event (and its associated failure information) in the collected failure information 167 occurring on a particular system 100 or 166 with corresponding types (e.g., models) of hardware components (i.e., retrieved from hardware inventory 173) that are installed in that particular system 100 or 166.

Following data analysis of block 304, a debug action or a manufacturing action or manufacturing change may be taken in block 306. For example, if statistical analysis of block 304 shows that a given type (e.g., manufacturer and model) of system storage device 160 has a failure rate that is greater than a predefined threshold maximum allowable failure rate (e.g., such as a 2% failure rate or other greater or lesser predefined failure rate), then a manufacturing decision may be made to replace the given system storage type with another type of system storage device in all future manufactured systems 100.

In another example, if statistical analysis of block 304 shows that a given type (e.g., manufacturer and model) of system storage device 160 has a failure rate that is greater than a predefined threshold maximum allowable failure rate (e.g., such as a 2% failure rate or other greater or lesser predefined failure rate) only when employed in a system 100 that has a given motherboard circuitry design and/or a given host programmable integrated circuit 110, then a debug action may be taken to determine a manufacturing action to take to correct the cause for the increased failure rate of the given type of system storage device 160 in future systems 100. For example, a manufacturing action may be taken in block 306 to stop shipping systems 100 with the current circuitry design of motherboard 105 that is shown by statistical analysis of block 304 to be associated with a system storage failure rate that is greater than the predefined threshold maximum allowable failure rate, and to instead ship all future systems with motherboards 105 having circuitry that has been redesigned based on debug analysis of block 306 to eliminate or reduce storage system failures. In another example, a manufacturing action may be taken to change programming and/or circuitry of host programmable integrated circuit 110 where debug analysis indicates that it is responsible system storage failure rate that is greater than the predefined threshold maximum allowable failure rate.

It will understood that the particular combination of blocks of methodology 300 is exemplary only, and that other combinations of additional and/or alternative blocks may be employed that are suitable for performing manufacturing quality control analysis to reduce system storage failure rate.

It will also be understood that one or more of the tasks, functions, or methodologies described herein (e.g., including those described herein for components 110, 150, 164, 165, 166, 167, 168, 171, 173, 180, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more blocks of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more blocks of the present methodologies may be employed in one or more code segments of the computer program. For example, a code segment executed by the information handling system may include one or more blocks of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method, comprising making a first attempt to read and write a system storage of a first information handling system across a first data communication path to load and boot an operating system (OS) on the first information handling system; and then
    providing a first request to the system storage for a current system storage status of the first information handling system across a second and different data communication path only if the first attempt to read and write the system storage fails to load and execute the OS due to an error that prevents reading and writing the system storage of the first information handling system.

2. The method of claim 1, further comprising then only one of:
    receiving the current system storage status from the system storage across the second data communication path in response to the first request, then taking one or more actions to correct the error preventing reading and writing of the system storage of the first information handling system, and then making a second and subsequent attempt to read and write the system storage of the first information handling system across the first data communication path to load and boot the OS on the first information handling system; or
    reporting a failure to read the system storage together with a unique identifier (UID) of the first information handling system across a network as a system storage failure event to a second information handling system if the current system storage status is not received from the system storage across the second data communication path in response to the first request to the system storage for a current status of the system storage of the first information handling system.

3. The method of claim 2, further comprising then analyzing data of the system storage failure event and the UID of the first information handling system received in the second information handling system to determine a needed field repair action and any replacement hardware components for the first information handling system that are needed to repair the error that prevents reading and writing the system storage of the first information handling system; and then repairing the first information handling system using the determined field repair action and any needed replacement hardware components.

4. The method of claim 2, further comprising then analyzing data of the system storage failure event and the UID of the first information handling system received in the second information handling system together with data of system storage failure events and UIDs of other information handling systems received in the second information handling system to determine that a given type of hardware system storage device component or a given type of hardware motherboard component of the first information handling system is causing the system storage failure event and to determine to make a manufacturing change to replace the given type of hardware system storage device component or the given type of hardware motherboard component with another type of hardware system storage device component or another type of hardware motherboard component in future manufactured information handling systems.

5. The method of claim 1, further comprising receiving the current system storage status from the system storage across the second data communication path in response to the first request, then taking one or more actions to correct the error preventing reading and writing of the system storage of the first information handling system, then making a second and subsequent attempt to read and write the system storage of the first information handling system across the first data communication path to load and boot the OS on the first information handling system, and then
    providing a second request to the system storage for one or more event logs of the system storage of the first information handling system across the second and different data communication path only if the second attempt fails to load and execute the OS due to the error that prevents reading and writing the system storage of the first information handling system, then receiving from the system storage the requested one or more event logs of the system storage, and then forwarding the received event logs of the system storage together with a unique identifier (UID) of the first information handling system across the network to a second information handling system.

6. The method of claim 5, where the one or more event logs comprise at least one of a Self-Monitoring, Analysis and Reporting Technology (S.M.A.R.T.) log, a persistent error log, or one or more telemetry counters.

7. The method of claim 5, further comprising then
    analyzing data of the system storage event logs and the UID of the first information handling system received in the second information handling system to determine a needed field repair action and any replacement hardware components for the first information handling system that are needed to repair the error that prevents reading and writing the system storage of the first information handling system;
    and then repairing the first information handling system using the determined field repair action and any needed replacement hardware components.

8. The method of claim 5, further comprising then analyzing data of the system storage event logs and the UID of the first information handling system received in the second information handling system together with data of event logs and UIDs of other information handling systems received in the second information handling system to determine that a given type of hardware system storage device component or a given type of hardware motherboard component of the first information handling system is causing the failure to read and write the system storage and to determine to make a manufacturing change to replace the given type of hardware system storage device component or the given type of hardware motherboard component with another type of hardware system storage device component or hardware motherboard component in all future manufactured information handling systems.

9. The method of claim 1, further comprising executing a host programmable circuit of the first information handling system to make the first attempt to read and write the system storage of the first information handling system across the first data communication path to load and boot an operating system (OS) on the host programmable integrated circuit of the first information handling system; and then
    providing a first command across a third and different data communication path from the host programmable integrated circuit of the first information handling system to an out-of-band programmable integrated circuit of the first information handling system to cause the out-of-band programmable integrated circuit to provide the first request to the system storage across the second and different data communication path for the current status of the system storage of the first information handling system across a second and different data communication path only if the first attempt to read and write the system storage fails to load and execute the OS due to the error that prevents reading and writing the system storage of the first information handling system.

10. The method of claim 9, further comprising then only one of:
receiving the current system storage status in the out-of-band programmable integrated circuit from the system storage across the second and different data communication path in response to the first request, then providing the received current system storage status from the out-of-band programmable integrated circuit to the host programmable integrated circuit across the third and different data communication path, then executing the host programmable integrated circuit to take one or more actions to correct the error preventing reading and writing of the system storage of the first information handling system, and then making a second and subsequent attempt to read and write the system storage of the first information handling system across the first data communication path to load and boot the OS on the first information handling system; or
failing to receive the current system storage status in the out-of-band programmable integrated circuit from the system storage across the second and different data communication path in response to the first request, then reporting the failure to receive the current system storage status in the out-of-band programmable integrated circuit from the system storage to the host programmable integrated circuit across the third and different data communication path, then executing the host programmable integrated circuit to report the failure to read the system storage together with a unique identifier (UID) of the first information handling system across a network to a second information handling system in response to the report from the out-of-band programmable integrated circuit of the failure to receive the current system storage status in the out-of-band programmable integrated circuit from the system storage.

11. The method of claim 9, further comprising receiving the current system storage status in the out-of-band programmable integrated circuit from the system storage across the second and different data communication path in response to the first request, then providing the received current system storage status from the out-of-band programmable integrated circuit to the host programmable integrated circuit across the third and different data communication path, then executing the host programmable integrated circuit to take one or more actions to correct the error preventing reading and writing of the system storage of the first information handling system, and then making a second and subsequent attempt to read and write the system storage of the first information handling system across the first data communication path to load and boot the OS on the first information handling system, and then
providing a second command across the third and different data communication path from the host programmable integrated circuit of the first information handling system to the out-of-band programmable integrated circuit of the first information handling systems to cause the out-of-band programmable integrated circuit to provide a second request to the system storage for one or more event logs of the system storage of the first information handling system across the second and different data communication path only if the second attempt fails to load and execute the OS due to the error that prevents reading and writing the system storage of the first information handling system, then receiving the one or more event logs in the out-of-band programmable integrated circuit from the system storage across the second and different data communication path in response to the second request, then providing the received one or more event logs from the out-of-band programmable integrated circuit across the third and different data communication path to the host programmable integrated circuit, and then executing the host programmable integrated circuit to forward the received event logs of the system storage together with a unique identifier (UID) of the first information handling system across a network to a second information handling system.

12. The method of claim 1, where the first attempt to read and write the system storage of the first information handling system fails to access the system storage due to a failure to detect the system storage.

13. An information handling system, comprising:
a host programmable integrated circuit;
system storage coupled to the host programmable integrated circuit by a first data communication path; and
an out-of-band programmable integrated circuit coupled to the system storage by a second and different data communication path and coupled to the host programmable integrated circuit by a third and different data communication path;
where the host programmable integrated circuit is programmed to make a first attempt to read and write the system storage across the first data communication path to load and boot an operating system (OS) on the information handling system, and then
provide a first command across the third data communication path from the host programmable integrated circuit to the out-of-band programmable integrated circuit only if the first attempt to read and write the system storage fails to load and execute the OS due to an error that prevents reading and writing the system storage of the information handling system, the first command causing the out-of-band programmable integrated circuit to provide a first request to the system storage across the second and different data communication path for the current status of the system storage of the information handling system.

14. The information handling system of claim 13, where the information handling system is a first information handling system coupled across a network to a second information handling system, the host programmable integrated circuit of the first information handling system being programmed to only one of:
receive via the third data communication path from the out-of-band programmable integrated circuit the current system storage status provided from the system storage across the second data communication path in response to the first request, then take one or more actions to correct the error preventing reading and writing of the system storage, and then make a second and subsequent attempt to read and write the system storage across the first data communication path to load and boot the OS on the first information handling system; or report a failure to read the system storage together with a unique identifier (UID) of the first information handling system across the network to the second information handling system if the current system storage status is not received from the system storage across the second data communication path in response to the first request and provided to the host programmable integrated circuit via the third data communication path from the out-of-band programmable integrated circuit.

15. The information handling system of claim 13, where the information handling system is a first information handling system coupled across a network to a second information handling system, the host programmable integrated circuit of the first information handling system being programmed to receive via the third data communication path from the out-of-band programmable integrated circuit the current system storage status provided from the system storage across the second data communication path in response to the first request, then take one or more actions to correct the error preventing reading and writing of the system storage-, then make a second and subsequent attempt to read and write the system storage across the first data communication path to load and boot the OS on the first information handling system, and then provide a second command across the third data communication path from the host programmable integrated circuit to the out-of-band programmable integrated circuit only if the second attempt to read and write the system storage fails to load and execute the OS due to the error that prevents reading and writing the system storage, the second command causing the out-of-band programmable integrated circuit to provide a second request to the system storage across the second and different data communication path for one or more event logs of the system storage, and then:

receive via the third data communication path from the out-of-band programmable integrated circuit the requested one or more event logs provided from the system storage across the second data communication path in response to the second request, and then forward the received event logs of the system storage together with a unique identifier (UID) of the first information handling system across the network to the second information handling system.

16. The information handling system of claim 15, where the one or more event logs comprise at least one of a Self-Monitoring, Analysis and Reporting Technology (S.M.A.R.T.) log, a persistent error log, or one or more telemetry counters.

17. The information handling system of claim 13, where the out-of-band programmable integrated circuit is programmed to respond to the first command received from the host programmable integrated circuit by providing the first request to the system storage across the second and different data communication path for the current status of the system storage; and receive via the third data communication path from the out-of-band programmable integrated circuit the current system storage status provided from the system storage across the second data communication path in response to the first request.

18. The information handling system of claim 17, where the out-of-band programmable integrated circuit is programmed to then only one of:

receive the current system storage status from the system storage across the second and different data communication path in response to the first request, then provide the received current system storage status to the host programmable integrated circuit across the third and different data communication path; or fail to receive the current system storage status from the system storage across the second and different data communication path in response to the first request, then report the failure to receive the current system storage status from the system storage to the host programmable integrated circuit across the third and different data communication path.

19. The information handling system of claim 17, where the out-of-band programmable integrated circuit is programmed to:

receive the current system storage status from the system storage across the second and different data communication path in response to the first request;

then provide the received current system storage status from the out-of-band programmable integrated circuit to the host programmable integrated circuit across the third and different data communication path;

then respond to a second command across the third and different data communication path from the host programmable integrated circuit by providing a second request to the system storage for one or more event logs of the system storage across the second and different data communication path;

then receive the one or more event logs from the system storage across the second and different data communication path in response to the second request; and then provide the received one or more event logs from the out-of-band programmable integrated circuit across the third and different data communication path to the host programmable integrated circuit.

20. The information handling system of claim 13, where the host programmable integrated circuit is programmed to provide the first command across the third data communication path from the host programmable integrated circuit to the out-of-band programmable integrated circuit when the host programmable integrated circuit fails to access the system storage due to a failure to detect the system storage.

21. A system comprising a client information handling system coupled across a network to a separate remote server information handling system; where the client information handling system comprises:

a host programmable integrated circuit;

system storage coupled to the host programmable integrated circuit by a first data communication path; and an out-of-band programmable integrated circuit coupled to the system storage by a second and different data communication path and coupled to the host programmable integrated circuit by a third and different data communication path;

where the host programmable integrated circuit is programmed to make a first attempt to read and write the system storage across the first data communication path to load and boot an operating system (OS) on the client information handling system, and then provide a first command across the third data communication path from the host programmable integrated circuit to the out-of-band programmable integrated circuit only if the first attempt to read and write the system storage fails to load and execute the OS due to an error that prevents reading and writing the system storage of the client information handling system, the first command causing the out-of-band programmable integrated circuit to provide a first request to the system storage across the second and different data communication path for the current status of the system storage of the client information handling system.

22. The system of claim 21, where the host programmable integrated circuit of the client information handling system is programmed to only one of:
receive via the third data communication path from the out-of-band programmable integrated circuit the current system storage status provided from the system storage across the second data communication path in response to the first request, then take one or more actions to correct the error preventing reading and writing of the system storage, and then make a second and subsequent attempt to read and write the system storage across the first data communication path to load and boot the OS on the client information handling system; or
report a failure to read the system storage together with a unique identifier (UID) of the client information handling system across the network as a system storage failure event to the remote server information handling system if the current system storage status is not received from the system storage across the second data communication path in response to the first request and provided to the host programmable integrated circuit via the third data communication path from the out-of-band programmable integrated circuit.

23. The system of claim 22, further comprising at least one programmable integrated circuit programmed to
analyze data of the system storage failure event and the UID of the client information handling system received in the remote server information handling system to determine a needed field repair action and any replacement hardware components for the client information handling system that are needed to repair the error that prevents reading and writing the system storage of the client information handling system; and then repairing the client information handling system using the determined field repair action and any needed replacement hardware components.

24. The system of claim 22, further comprising at least one programmable integrated circuit programmed to analyze data of the system storage failure event and the UID of the client information handling system received in the remote server information handling system together with data of system storage failure events and UIDs of other client information handling systems received in the remote server information handling system to determine that a given type of hardware system storage device component or a given type of hardware motherboard component of the client information handling system is causing the system storage failure event and to determine to make a manufacturing change to replace the given type of hardware system storage device component or the given type of hardware motherboard component with another type of hardware system storage device component or another type of hardware motherboard component in future manufactured information handling systems.

25. The system of claim 24, where each of the host programmable integrated circuit, system storage, out-of-band programmable integrated circuit, and first data communication path are all hardware components within the same desktop computer, laptop computer, or tablet computer.

26. The system of claim 21, where the host programmable integrated circuit of the client information handling system is programmed to receive via the third data communication path from the out-of-band programmable integrated circuit the current system storage status provided from the system storage across the second data communication path in response to the first request, then take one or more actions to correct the error preventing reading and writing of the system storage, then make a second and subsequent attempt to read and write the system storage across the first data communication path to load and boot the OS on the client information handling system, and then
provide a second command across the third data communication path from the host programmable integrated circuit to the out-of-band programmable integrated circuit only if the second attempt to read and write the system storage fails to load and execute the OS due to the error that prevents reading and writing the system storage, the second command causing the out-of-band programmable integrated circuit to provide a second request to the system storage across the second and different data communication path for one or more event logs of the system storage, and then:
receive via the third data communication path from the out-of-band programmable integrated circuit the requested one or more event logs provided from the system storage across the second data communication path in response to the second request, and
then forward the received event logs of the system storage together with a unique identifier (UID) of the client information handling system across the network to the remote server information handling system.

27. The system of claim 26, further comprising at least one programmable integrated circuit programmed to at least one of:
analyze data of the system storage event logs and the UID of the client information handling system received in the remote server information handling system to determine a needed field repair action and any replacement hardware components for the client information handling system that are needed to repair the error that prevents reading and writing the system storage of the client information handling system; and then repairing the client information handling system using the determined field repair action and any needed replacement hardware components.

28. The system of claim 26, further comprising at least one programmable integrated circuit programmed to analyze data of the system storage event logs and the UID of the client information handling system received in the remote server information handling system together with data of system storage event logs and UIDs of other client information handling systems received in the remote server information handling system to determine that a given type of hardware system storage device component or a given type of hardware motherboard component of the client information handling system is causing the failure to read and write the system storage and to determine to make a manufacturing change to replace the given type of hardware system storage device component or the given type of hardware motherboard component with another type of hardware system storage device component or hardware motherboard component in all future manufactured information handling systems.

29. The system of claim 21, where the host programmable integrated circuit is programmed to provide the first command across the third data communication path from the host programmable integrated circuit to the out-of-band programmable integrated circuit when the host programmable integrated circuit fails to access the system storage due to a failure to detect the system storage.

* * * * *